UNITED STATES PATENT OFFICE.

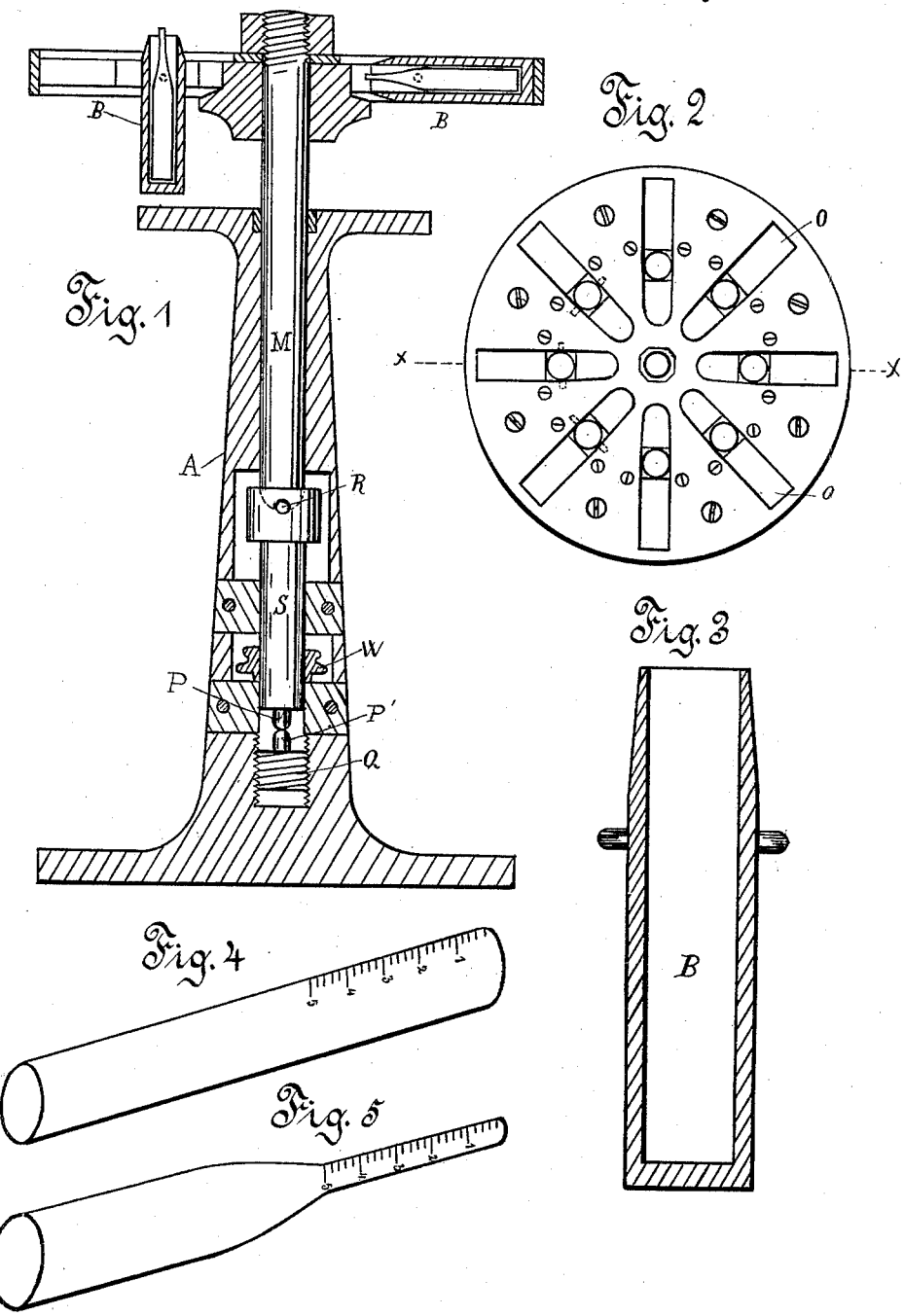

GEORGE W. TOWAR, JR., OF DETROIT, MICHIGAN.

MACHINE FOR TESTING MILK AND CREAM.

SPECIFICATION forming part of Letters Patent No. 431,128, dated July 1, 1890.

Application filed August 19, 1889. Serial No. 321,198. (No model.)

*To all whom it may concern:*

Be it known that I, GEORGE W. TOWAR, Jr., a citizen of the United States, residing at Detroit, in the county of Wayne and State of Michigan, have invented a new and useful Improvement in Centrifugal Machines for Testing Milk and Cream, of which the following is a specification.

This invention relates to machines for testing and determining the quantity of fat matter or butter-fat in cream, or for determining the quantity of cream in milk, or for determining the quantity of fat or butter-fat in milk.

The invention pertains to that class of machines in which the fat or lighter portion is separated from the heavier portion of the milk by centrifugal action.

Figure 1 represents in vertical section the entire machine. Fig. 2 shows a top plan of the rotating disk. Fig. 3 shows a cross-section of a box B hung in the rotating disk. Figs. 4 and 5 show the graduated test-tubes, in which is contained the liquid to be tested.

A frame-work or standard A has an upright spindle S mounted in suitable boxes, so that it may be rotated with as small a degree of resistance as is possible. I prefer to make the lower bearing of this spindle S in the shape of a hardened-steel pin P, having a spherical surface on the lower end, which rests upon a corresponding spherical surface on the upper end of pin P', projecting from the upper side of a screw-plug Q. The spindle S runs in boxes, which keep it in an upright position and allow the end-thrust downward to come upon the pins P P'. In the upper end of the spindle S is a deep hemispherical concavity, across which passes a short rod or bolt R. A suitable pulley W is fixed on the spindle S, and is grooved to receive a driving-belt, by means of which a rapid rotary motion is communicated to the spindle.

The frame-work is extended above the top of the spindle S, and is pierced to permit the insertion through it of the secondary spindle M, which has the hemispherical lower end with an indentation across it to fit over the pin R in the concavity at the top of the spindle S.

The spindle M fits quite loosely in the frame-work A, except at the extreme summit of the frame-work, where there is a box arranged to hold the spindle M upright, although not to embrace it closely, the operation of the machine being to have the entire thrust come on the pin R and to run balanced and out of contact with other parts of the frame-work when under speed.

On the top of the spindle M is a circular head, in which there is a number of radial slots or openings O. In each slot O is hung on pivots or trunnions a box B. The trunnions are nearer to that end of the box that slides toward the center than to the other end of the box, so that when at rest the box takes an upright position, as shown at the left in Fig. 1, and when in rapid motion the box takes a horizontal position, as shown at the right, approximately closing the slot and giving to the upper and under surface of the disk or head smooth unbroken faces offering the least possible resistance to rotation.

The opening of the interior of the box is just sufficient to allow the test-tube (shown in Figs. 4 and 5) to fit snugly in it. The test-tubes which I employ are fashioned according to the work which I desire to do. They are of glass and are graduated at the upper end, the space between the lines of graduation being in some proportion to the contents of the entire tube. Preferably the graduation should be such that the quantity of material contained between any two consecutive lines of graduation will be a given percentage of the contents of the entire tube.

For material containing a large amount of fatty matter or a large amount of matter which it is desired to separate from the heavier liquid I use a test-tube, such as is shown in Fig. 4, where the interior bore is of equal diameter throughout. In material where the fatty matter is comparatively small in amount I use a test-tube in which the neck or open end is drawn down to a smaller diameter, as is shown in Fig. 5. Thus, for example, the test-tube Fig. 5 would be used in determining the amount of butter-fat in milk, while a test-tube like that shown in Fig. 4 would be used in determining the amount of cream in the milk or the amount of butter-fat in cream.

In operation the material to be tested is placed in the appropriate test-tube and the test-tube dropped into the box B. A sufficient number of the boxes are occupied to balance the disk, and when the test-tubes have been placed in the boxes the disk is put in rapid motion by means of the spindle S and driving-pulley W, the wheel W being driven from any convenient source of power. The rotation of the disk causes the boxes and the contained test-tubes to assume a horizontal position, and then causes the liquid contained in the test-tubes to separate into its lighter and heavier constituents, the heavier part going to the outer or lower end and the lighter part going to the inner or upper end.

The use of the trunnion-box enables me to use a wide-mouthed test-tube or narrow test-tube at will, without any danger that the contained liquid will spill out when it is inserted in the box, and renders it unnecessary to cap or cover the tube in any way, and enables me to insert the test-tube into position to be used with great ease.

Having thus described my invention, what I claim as novel, and desire to have secured to me by Letters Patent, is—

In a machine for testing milk, the combination, with a rotatable disk having a series of radiating vertical slots therein, boxes pivotally suspended in the slots, having a width equal to or less than the thickness of the slotted disk and a length equal to or less than the length of the slots, whereby the same are entirely inclosed in the slots when the disk is rotated, substantially as described.

GEORGE W. TOWAR, JR.

Witnesses:
EFFIE I. CROFT,
D. FARRAND HENRY.